(12) United States Patent
Dillon

(10) Patent No.: US 11,644,137 B2
(45) Date of Patent: May 9, 2023

(54) COVER

(71) Applicant: IAMADILLO PTY LTD, Goondiwindi (AU)

(72) Inventor: Darren John Dillon, Goondiwindi (AU)

(73) Assignee: IAMADILLO PTY LTD, Queensland (AU)

( * ) Notice: Subject to any disclaimer, the term of this patent is extended or adjusted under 35 U.S.C. 154(b) by 535 days.

(21) Appl. No.: 16/613,550

(22) PCT Filed: May 16, 2018

(86) PCT No.: PCT/AU2018/050458
§ 371 (c)(1),
(2) Date: Nov. 14, 2019

(87) PCT Pub. No.: WO2018/209386
PCT Pub. Date: Nov. 22, 2018

(65) Prior Publication Data
US 2021/0164598 A1 Jun. 3, 2021

(30) Foreign Application Priority Data
May 18, 2017 (AU) .................................. 2017901879

(51) Int. Cl.
*F16L 37/084* (2006.01)
*F16L 55/11* (2006.01)
*H01R 13/447* (2006.01)

(52) U.S. Cl.
CPC ....... *F16L 37/0847* (2013.01); *F16L 55/1141* (2013.01); *F16L 2201/80* (2013.01); *H01R 13/447* (2013.01)

(58) Field of Classification Search
CPC .............. F16L 37/0847; F16L 55/1141; F16L 2201/80; H01R 13/447
See application file for complete search history.

(56) References Cited

U.S. PATENT DOCUMENTS

| 4,481,977 A | 11/1984 | Maldavs |
| 4,930,543 A | 6/1990 | Zuiches |
| 5,401,184 A * | 3/1995 | Sundstrom ......... H01R 13/6392 174/67 |

(Continued)

FOREIGN PATENT DOCUMENTS

| CN | 201412631 Y | 2/2010 |
| EP | 1073156 A1 | 1/2001 |

(Continued)

OTHER PUBLICATIONS

EPO English Translation of DE 20 2007 005 228 U1 Description.*
International Search Report and Written Opinion for PCT/AU2018/050458 dated Jun. 20, 2018; 12 pages.

*Primary Examiner* — James M Hewitt, II
(74) *Attorney, Agent, or Firm* — Schwabe, Williamson & Wyatt, PC

(57) ABSTRACT

A cover for a connector, wherein the cover is adapted to be locateable over at least a portion of the connector, and wherein the connector has a fluid pathway formed therethrough. The connector has a first portion and a second portion, and wherein, when the cover is located over the portion of the connector, ingress of impurities into the fluid pathway is prevented.

13 Claims, 7 Drawing Sheets

(56) References Cited

U.S. PATENT DOCUMENTS

| | | | |
|---|---|---|---|
| 5,443,397 A * | 8/1995 | Carl | H01R 13/6392 |
| | | | 439/369 |
| 5,762,515 A * | 6/1998 | Mele | H01R 13/6392 |
| | | | 439/367 |
| 6,298,882 B1 | 10/2001 | Hayes | |
| 7,165,576 B2 | 1/2007 | Carmack | |
| 7,695,022 B2 * | 4/2010 | Wells | F16L 55/11 |
| | | | 285/239 |
| 7,942,694 B2 | 5/2011 | Amidon | |
| 9,461,393 B2 * | 10/2016 | Carley | A61B 5/303 |
| 2003/0172513 A1 | 9/2003 | Takei | |
| 2006/0014411 A1 | 1/2006 | Stair | |
| 2006/0141846 A1 | 6/2006 | Davis | |
| 2012/0192980 A1 | 8/2012 | Williams | |

FOREIGN PATENT DOCUMENTS

| | | | |
|---|---|---|---|
| GB | 1509637 | A | 5/1978 |
| JP | H0735289 | A | 2/1995 |
| JP | 2006-038175 | A | 2/2006 |
| KR | 1020030073194 | | 9/2003 |
| KR | 101006544 | B1 | 1/2011 |
| WO | 2012/048379 | A1 | 4/2012 |

* cited by examiner

COVER

CROSS-REFERENCE TO RELATED APPLICATION

The present application is a national phase entry under 35 U.S.C. § 371 of International Application No. PCT/AU2018/050458, filed May 16, 2018, which designates the United States of America, which claims priority to AU Application No. 2017901879, filed May 18, 2017, the entire disclosures of each of these applications are hereby incorporated by reference in their entireties and for all purposes.

FIELD OF THE INVENTION

The invention relates to a cover. In particular, the invention relates, but is not limited, to a cover for a connector in the form of a breakaway fitting, coupling or joint.

BACKGROUND TO THE INVENTION

Reference to background art herein is not to be construed as an admission that such art constitutes common general knowledge in Australia or elsewhere.

Connectors in the form of breakaway fittings, couplings or joints assist in providing a leak-proof connection and can be disconnected upon application of a pulling force. These connectors may be hydraulic, pneumatic or electrical fittings and may be formed from a number of materials including ceramic, steel or composites.

Such connectors generally comprise of two portions that engage with one another to form the fitting. However, water, dirt or other impurities are known to enter and accumulate in the breakaway fittings which render them unserviceable and makes it difficult to disconnect them when required.

OBJECT OF THE INVENTION

It is an aim of this invention to provide a cover for a connector which overcomes or ameliorates one or more of the disadvantages or problems described above, or which at least provides a useful alternative.

Other preferred objects of the present invention will become apparent from the following description.

SUMMARY OF INVENTION

In one form, although not necessarily the only or broadest form, the invention resides in a cover for a connector, wherein the cover is adapted to be locateable over at least a portion of the connector, and wherein the connector has a fluid pathway formed therethrough.

Preferably, the connector has a first portion and a second portion. Preferably, the fluid pathway is formed through the first and second portions when the first portion is engaged with the second portion.

Preferably, the cover is adapted to be locateable over at least a portion of a plug and the second portion of the connector. Preferably, the plug is releasably engageable with the second portion of the connector. Preferably, a proximal end of the plug is adapted to be insertable in the second portion.

Preferably, when the cover is located over the portion of the connector, the cover is substantially in contact with the portion of the connector.

Preferably, the cover is substantially cylindrical in shape. Preferably, the cover is hollow.

Preferably, the cover comprises:
a first end;
a second end; and
an intermediate portion located between the first and second ends,
wherein a diameter of the intermediate portion is greater than a diameter of the first end and/or the second end.

Preferably, the intermediate portion comprises:
a first frustoconical portion;
a second frustoconical portion; and
a central portion located between the first and second frustoconical portions.

Preferably, the central portion is cylindrical in shape and has a uniform diameter. Preferably, the diameter of the central portion is equal to the diameter of the intermediate portion.

Preferably, the first end has a ridge at a distal end of the first end. Preferably, the second end has a ridge at a distal end of the second end.

Preferably, the cover is formed from an elastic material.

Preferably, when the cover is located over the portion of the connector, ingress of impurities into the fluid pathway is prevented.

Preferably, when the cover is located over at least a portion of the plug and the second portion, ingress of impurities into the second portion is prevented.

Preferably, when the cover is located over the portion of the connector, the cover holds the first and second portions in an engaged configuration where the first portion is engaged with the second portion.

Preferably, the cover is permanently attached to the second portion.

In another form the invention resides in a cover system comprising:
a plug adapted to be releasably engageable with a second portion of a connector; and
a cover adapted to be locateable over at least a portion of a first portion and the second portion of the connector or over the plug and the second portion of the connector.

Preferably, the second portion is releasably engageable with the first portion. Preferably, when the first portion is engaged with the second portion, a fluid pathway is formed through the first and second portions.

Preferably, when the cover is located over the portions of the first and second portions, the cover is substantially in contact with the portions of the first and second portions.

In another form the invention resides in a method of connecting a first portion and a second portion of a connector system, the method including the steps of:

locating a cover over at least a portion of the second portion; rolling back a first end of the cover over at least a portion of a second end of the cover;

engaging the first portion with the second portion; and
unrolling the first end of the cover, wherein, upon unrolling the first end of the cover, the first end of the cover is located over at least a portion of the first portion, and wherein, when the first portion is engaged with the second portion, a fluid pathway is formed through the first and second portions.

Preferably, locating the cover over the portion of the second portion includes permanently attaching the cover to the second portion.

Preferably, when the first end of the cover is located over the portion of the first portion, ingress of impurities into the fluid pathway is prevented.

In another form the invention resides in a connector system comprising:
 a connector comprising:
  a first portion;
  a second portion releasably engageable with the first portion; and
  a cover locateable over at least a portion of the first and second portions,
 wherein, when the first portion is engaged with the second portion, a fluid pathway is formed through the first and second portions.

Preferably, the connector system further comprises a plug. Preferably, the plug is releasably engageable with the second portion.

Preferably, the cover is locateable over at least a portion of the plug and the second portion.

Preferably, the cover is permanently attached to the second portion.

Preferably, the connector is a breakaway fitting, breakaway coupling or a breakaway joint.

Preferably, the connector system is herein as described.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
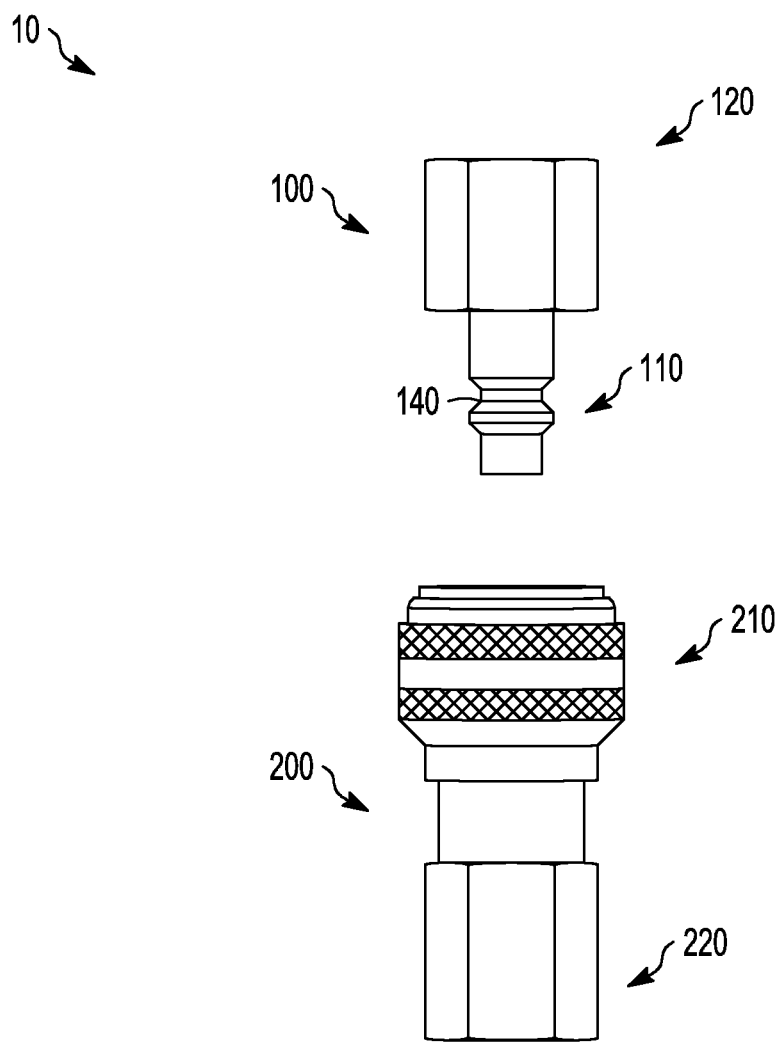
FIG. 1 illustrates a front view of a first portion and a second portion of a connector, according to an embodiment of the invention.

FIG. 1 illustrates a connector 10 in the form of a breakaway fitting, according to an embodiment of the invention. The connector 10 includes a first portion 100 and a second portion 200. The first portion 100 and second portion 200 of the connector 10 are hollow, thereby creating a fluid pathway for a fluid to flow through the connector 10.

The first portion 100 is formed from a metal. The metal in this embodiment includes steel. However, in further embodiments the first portion 100 may be made from different materials including, for example, a composite, aluminium or brass.

The first portion 100 has a proximal end 110, a distal end 120 and a bore 130 that extends through the proximal end 110 and the distal end 120 of the first portion 100.

The distal end 120 of the first portion 100 is cylindrical and has an exterior surface and an internal surface. The internal surface of the distal end 120 of the first portion 100 is threaded to be able to engage with other components of a hydraulic, pneumatic or electrical system. The exterior surface of the distal end 120 of the first portion 100 has a hexagonal shape with six flat surfaces adjacent to each other. However, in further embodiments, the exterior surface of the distal end 120 of the first portion 100 may be curved or have one or more curved portions. Moreover, in further embodiments, the internal surface of the distal end 120 of the first portion 100 may include notches, protrusions or any other features to engage with other components of a hydraulic, pneumatic or electrical system.

The proximal end 110 of the first portion 100 is also cylindrical and has an exterior surface and an internal surface. The exterior surface of the proximal end 110 of the first portion 100 comprises two portions, each portion having a different external diameter. However, in further embodiments, the exterior surface of the proximal end 110 of the first portion 100 may comprise a single curved surface with a specific external diameter.

Both the external diameters of the exterior surface of the proximal end 110 of the first portion 100 are less than the external diameter of the distal end 120 of the first portion 100. However, in further embodiments, the external diameters of the exterior surfaces of the proximal end 110 and the distal end 120 of the first portion 100 may be equal or the external diameters of the exterior surface of the proximal end 110 of the first portion 100 may be greater than the external diameter of the distal end 120 of the first portion 100.

The exterior surface of the proximal end 110 of the first portion 100 comprises a notch 140 and a protrusion, in the form of a ridge, formed on the exterior surface, to releasably engage with the second portion 200 of the connector 10. However, in further embodiments, the exterior surface of the proximal end 110 of the first portion 100 may comprise other features to releasably engage with the second portion 200.

The second portion 200 has a proximal end 210, a distal end 220 and a bore 230 that extends through the proximal end 210 and the distal end 220 of the second portion 200.

The distal end 220 of the second portion 200 is cylindrical and has an exterior surface and an internal surface. The internal surface of the distal end 220 of the second portion 200 is threaded to be able to engage with other components of a hydraulic, pneumatic or electrical system. The exterior surface of the distal end 220 of the second portion 200 has a hexagonal shape with six flat surfaces adjacent to each other. However, in further embodiments, the exterior surface of the distal end 220 of the second portion 200 may be curved or have one or more curved portions. Moreover, in further embodiments, the internal surface of the distal end 220 of the second portion 200 may include notches, protrusions or any other features to engage with other components of a hydraulic, pneumatic or electrical system.

The proximal end 210 of the second portion 200 is also cylindrical and has an exterior surface and an internal surface. The diameter of the exterior surface of the proximal end 210 of the second portion 200 is greater than the diameter of the exterior surface of the distal end 220 of the second portion 200 and the diameter of the exterior surface of the distal end 120 of the first portion 100.

The exterior surface of the proximal end 210 of the second portion 200 comprises grooves or formations that make it easier for a user to firmly grip the proximal end 210 of the second portion 200. However, in further embodiments, the exterior surface of the proximal end 210 of the second portion 200 may have any other features which achieve the same effect.

The interior surface of the proximal end 210 of the second portion 200 has a series of protrusions 240, formed in a ring-like arrangement along the circumference of the bore 230, that are received in the notch 140 of the exterior surface of the proximal end 110 of the first portion 100, when the first portion 100 is engaged with the second portion 200.

However, in further embodiments, the proximal end 110 of the first portion 100 and the proximal end 210 of the second portion 200 may be identical in shape.

When the first portion 100 is engaged with the second portion 200, a fluid pathway is formed through the bore 130 of the first portion 100 and the bore 230 of the second portion 200. Thus, a fluid, for example, oil, water, a coolant or compressed air, is able to flow from a component attached to the distal end 120 of the first portion 100, through the bore 130 of the first portion 100 and the bore 230 of the second portion 200, to another component attached to the distal end 220 of the second portion 200 or vice-versa. In further embodiments, the first portion 100 and/or second portion 200 of the connector 10 may comprise features that substantially restrict the flow of a fluid through the bores 130, 230 when the first portion 100 and the second portion 200 are not engaged with each other.

Moreover, in further embodiments, the engagement of the first portion 100 with the second portion 200 may result in an electrical connection that allows for electrical energy to flow from the first portion 100 to the second portion 200 or vice-versa.

Figure 2:
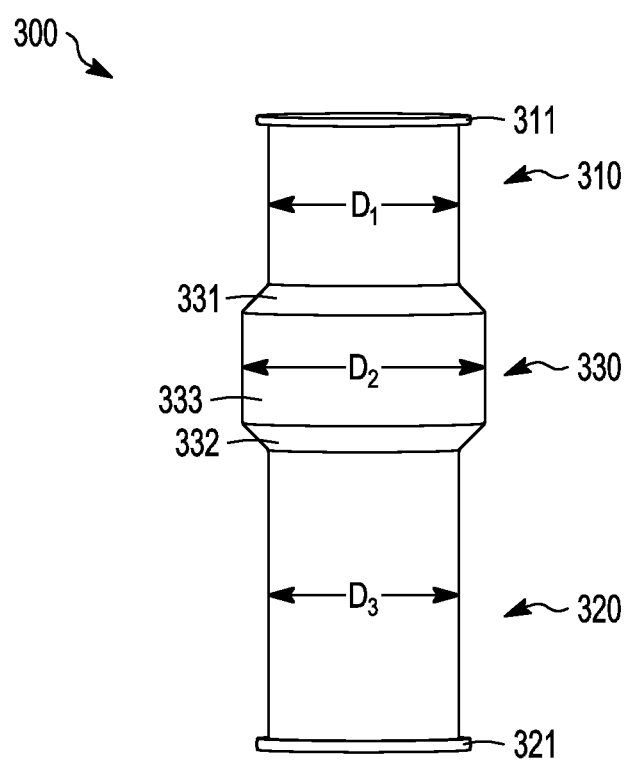
FIG. 2 illustrates a front view cover for the connector shown in FIG. 1.

FIG. 2 illustrates a cover 300 to be used with the connector 10. The cover 300 comprises a first end 310, a second end 320 and an intermediate portion 330. The cover 300 is substantially cylindrical in shape and hollow.

The first end 310 has a ridge 311 at its distal end which extends continuously along the circumference of the distal end of the first end 310. Similarly, the second end 320 has a ridge 321 at its distal end which extends continuously along the circumference of the distal end of the second end 320. The ridges 311, 321 provide additional strength and support to the distal ends of the first and second ends 310, 320 of the cover 300.

The cover 300 is formed from an elastic material. The elasticity of the cover 300 enables it to be used with connectors of various sizes and shapes. However, in further embodiments the cover 300 may be made from different materials including, for example, a composite, a metal, or wood, or a combination of one or more different materials.

The first end 310 and the second end 320 of the cover 300 are substantially similar in shape. However, in further embodiments, the first end 310 and the second end 320 of the cover 300 may have different shapes and sizes.

The intermediate portion 330 of the cover 300 has a shape corresponding to the proximal end 210 of the second portion 200. The intermediate portion 330 of the cover 300 includes two frustoconical portions 331, 332 and a central portion 333, with each frustoconical portion being located at an end of the central portion 333. The first frustoconical portion 331 is located between the central portion 333 and the first end 310 of the cover 300, and the second frustoconical portion 332 is located between the central portion 333 and the second end 320 of the cover 300. However, in further embodiments, the transition between the central portion 333 of the intermediate portion 330 and the first and second ends 310, 320 of the cover 300 may be differently shaped, for example, the transition may be curved or comprise one or more steps.

The first end 310 and the second end 320 of the cover 300 and the central portion 333 of the intermediate portion 330 are cylindrical in shape and have a uniform diameter $D_1$, $D_2$, $D_3$ respectively. The diameter $D_3$ of the central portion 333 of intermediate portion 330 of the cover 300 is greater than the diameter $D_1$ of the first end 310 and the diameter $D_2$ of the second end 320 of the cover 300. However, in further embodiments, the first end 310, the second end 320 and intermediate portion 330 of the cover 300 may be substantially similar in shape and size, with equal diameters. Further, in this embodiment, the diameter $D_1$ of the first end 310 and the diameter $D_2$ of the second end 320 of the cover 300 are the same. However, in further embodiments, the diameter $D_1$ of the first end 310 may be greater than or lesser than the diameter $D_2$ of the second end 320.

Figure 3:
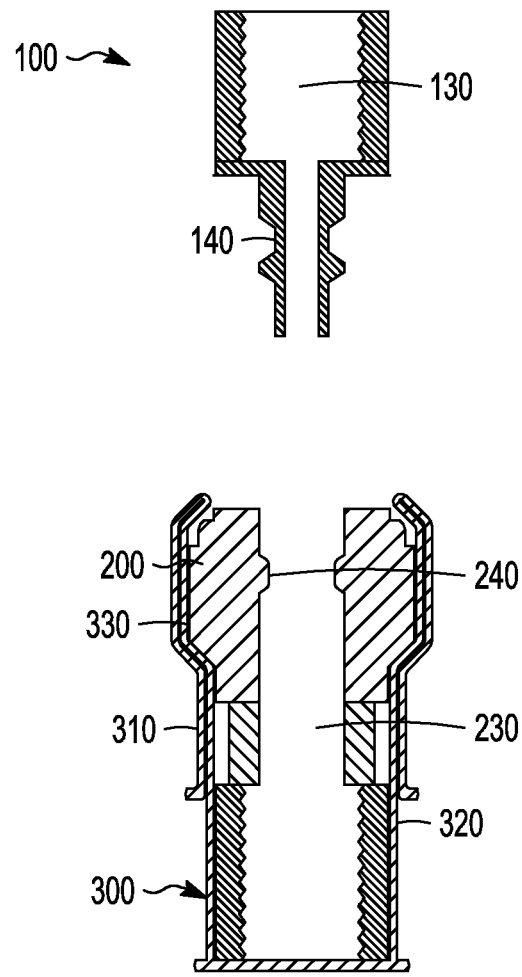
FIG. 3 illustrates a cross-sectional view of the connector of FIG. 1 when the cover is rolled back to engage the first and second portions with each other.
Figure 4:
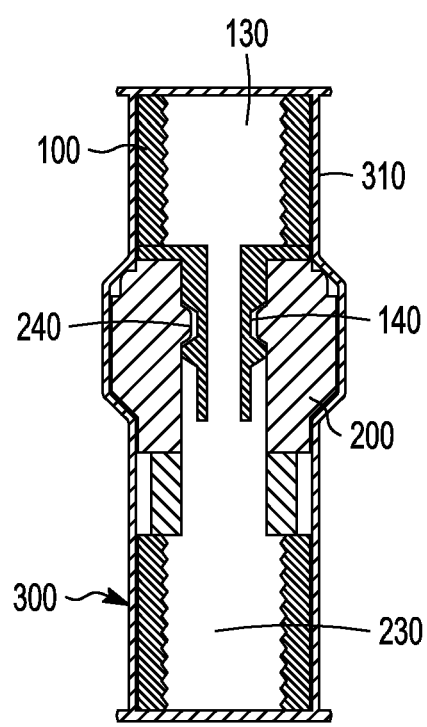
FIG. 4 illustrates a cross-sectional view of the connector of FIG. 1 with the cover placed over the first and second portions.

FIGS. 3 and 4 illustrate the cover 300 in use with the connector 10. In use, as shown in FIG. 3, the cover 300 is initially located over the second portion 200 such that the second end 320 of the cover 300 is located over the distal end 220 of the second portion 200. However, in further embodiments, the cover 300 may be located over only a portion of the second portion 200 and/or the cover 300 may be permanently attached/bonded to the exterior surface of the second portion 200 by an adhesive or any other form of bonding. Moreover, in further embodiments, the cover 300 may be initially located over a portion of the first portion 100 or substantially over the first portion 100.

The first end 310 of the cover 300 is then rolled back substantially over the intermediate portion 330 and partially over the second end 320 of the cover 300 to expose the bore 230 of the second portion 200 at the proximal end 210 of the second portion 200. However, in further embodiments, the first end 310 of the cover 300 may be rolled back only partially over the intermediate portion 330 or substantially over the second end 320 of the cover 300.

The first portion 100 is then engaged with the second portion 200 by inserting the proximal end 110 of the first portion 100 into the bore 230 of the second portion 200 at the proximal end 210 of the second portion 200, such that the series of protrusions 240 on the interior surface of the proximal end 210 of the second portion 200 are engaged by the notch 140 on the proximal end 110 of the first portion 100.

After engaging the first portion 100 with the second portion 200, the first end 310 of the cover 300 is unrolled resulting in the first end 310 of the cover 300 being located over the distal end 120 of the first portion 100. However, in further embodiments, when the first end 310 of the cover 300 is unrolled, the first end 310 of the cover 300 may be located over only a portion of the distal end 120 of the first portion.

As shown in FIG. 4, when the cover is located over the first portion 100 and the second portion 200, the internal surface of the cover 300 is in contact with the exterior surface of the distal end 120 of the first portion and the exterior surfaces of the proximal end 210 and the distal end 220 of the second portion 200. However, in further embodiments, the internal surface of the cover 300 may be only partially in contact with the exterior surfaces of the proximal end 210 and the distal end 220 of the second portion 200 and/or the exterior surface of the distal end 120 of the first portion.

When the cover is located over the first portion 100 and the second portion 200, which have been engaged with each other, any dirt particles, fluids or other impurities are prevented from entering the fluid pathway, accumulation of which may otherwise render the connector unusable or make it significantly difficult to disengage the first portion 100 from the second portion 200. The cover 300 also allows for quick disengagement of the first and second portions as the cover can be easily rolled back to disengage the first portion from the second portion when needed.

The cover also protects the exterior surfaces of the first portion 100 and the second portion 200 of the connector 10 from external elements, thereby preventing any physical damage to the connector that might occur. Moreover, the cover 300 holds the first and second portions of the connector in an engaged configuration (where the first portion 100 is engaged with the second portion 200), thereby preventing any undesirable movement of the first and second portion relative to each other which might result in accidental disengagement of the first portion 100 with the second portion 200.

Figure 5:
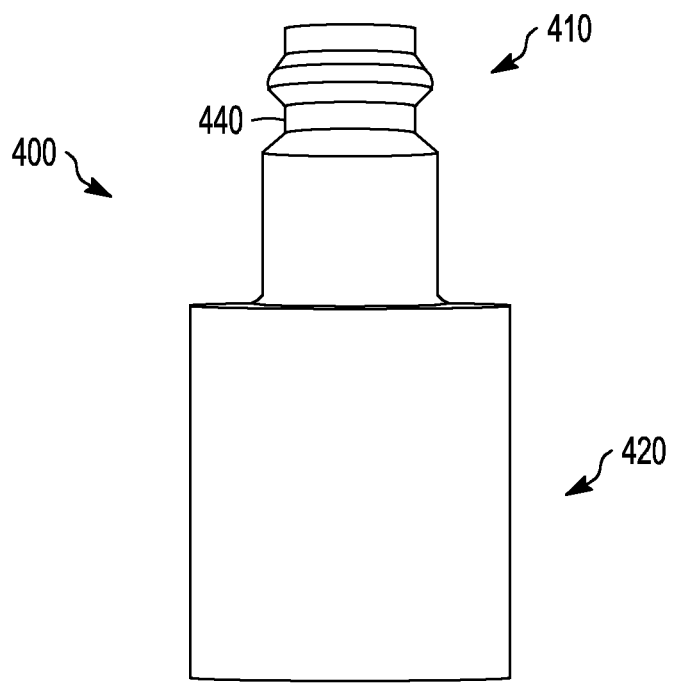
FIG. 5 illustrates a front view of a plug to be used with the second portion of the connector shown in FIG. 1.
Figure 6:
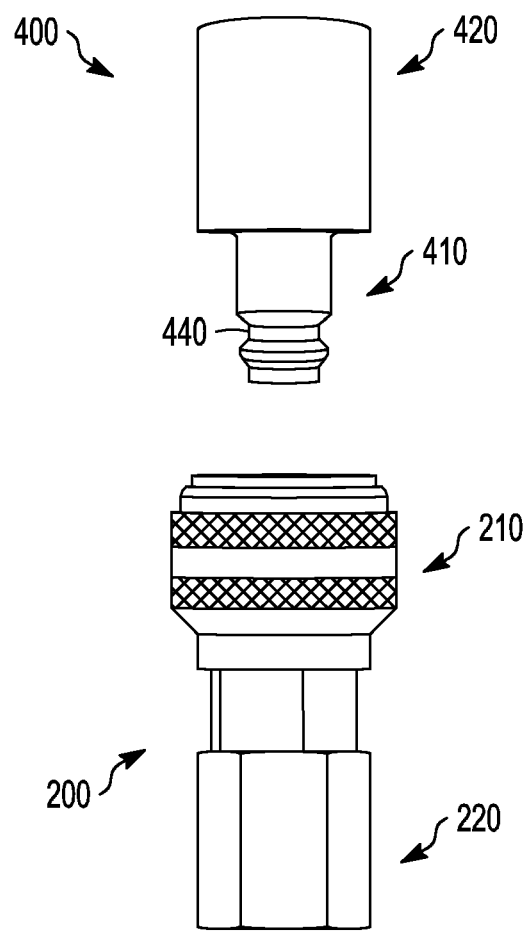
FIG. 6 illustrates a front view of the plug shown in FIG. 5 with the second portion of the connector shown in FIG. 1.

FIGS. 5 and 6 illustrate a plug 400 to be used with the second portion 200 of the connector 10. However, in further embodiments, the plug may be used with the first portion 100 or with both portions of the connector 10. The plug 400 and the cover 300 together comprise a cover system for the connector 10.

The plug 400 is integrally formed and does not comprise a bore. However, in further embodiments, the plug may comprise a partial bore or a bore that extends throughout the length of the plug 400.

The plug 400 is formed from a polymer. The polymer in this embodiment includes rubber. However, in further embodiments the plug 400 may be made from different materials including, for example, a composite, plastic or metal.

The plug 400 has a proximal end 410 and a distal end 420. The distal end 420 of the plug 400 is cylindrical and has a smooth exterior surface. The proximal end 410 of the plug 400 is also cylindrical and has an exterior surface. The exterior surface of the proximal end 410 of the plug 400 comprises two portions, each portion having a different external diameter. However, in further embodiments, the exterior surface of the proximal end 410 of the plug 400 may comprise a single curved surface with a specific external diameter.

Both the external diameters of the exterior surface of the proximal end 410 of the plug 400 are less than the external diameter of the distal end 420 of the plug 400. However, in further embodiments, the external diameters of the exterior surfaces of the proximal end 410 and the distal end 420 of the plug 400 may be equal or the external diameters of the exterior surface of the proximal end 410 of the plug 400 may be greater than the external diameter of the distal end 420 of the plug 400.

The exterior surface of the proximal end 410 of the plug 400 comprises a notch 440 and a protrusion, in the form of a ridge, formed on the exterior surface, to releasably engage with the second portion 200 of the connector 10. However, in further embodiments, the exterior surface of the proximal end 410 of the plug 400 may comprise other features to releasably engage with the second portion 200.

Figure 7:
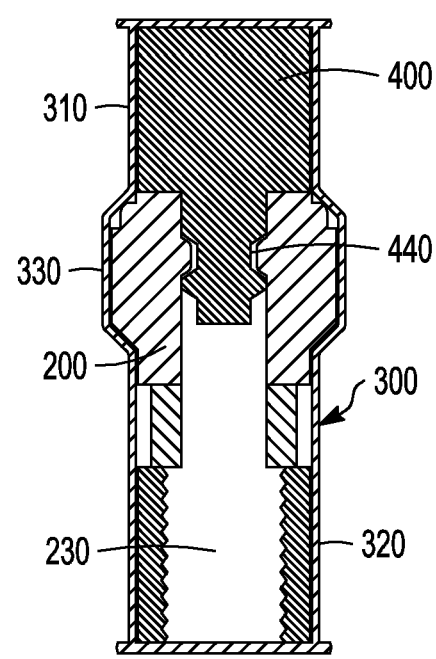
FIG. 7 illustrates a cross-sectional view of the plug and the second portion of FIG. 6 with the cover placed over the plug and the second portion.

FIG. 7 illustrates the cover 300 in use with the plug 400 and the second portion 200 of the connector 10, when the plug 400 is attached to the second portion 200 of the connector 10. The method of locating the cover over the plug 400 and the second portion 200 of the connector 10 is similar to that shown in FIGS. 3 and 4. In use, the cover 300 is initially located over the second portion 200 of the connector 10 such that the second end 320 of the cover 300 is located over the distal end 220 of the second portion 200. However, in further embodiments, the cover 300 may be located over only a portion of the second portion 200 and/or the cover 300 may be permanently attached/bonded to the exterior surface of the second portion 200 by an adhesive or any other form of bonding. Moreover, in further embodiments, the cover 300 may be initially located over a portion of the first portion 100 or substantially over the first portion 100.

The first end 310 of the cover 300 is then rolled back substantially over the intermediate portion 330 and partially over the second end 320 of the cover 300 to expose the bore 230 of the second portion 200 at the proximal end 210 of the second portion 200. However, in further embodiments, the first end 310 of the cover 300 may be rolled back only partially over the intermediate portion 330 or substantially over the second end 320 of the cover 300.

The plug 400 is then engaged with the second portion 200 by inserting the proximal end 410 of the plug 400 into the bore 230 of the second portion 200 at the proximal end 210 of the second portion 200, such that the series of protrusions 240 on the interior surface of the proximal end 210 of the second portion 200 are engaged by the notch 440 on the proximal end 410 of the plug 400.

After engaging the plug 400 with the second portion 200, the first end 310 of the cover 300 is unrolled resulting in the first end 310 of the cover 300 being located over the distal end 420 of the plug 400. However, in further embodiments, when the first end 310 of the cover 300 is unrolled, the first end 310 of the cover 300 may be located over only a portion of the distal end 420 of the plug 400.

As shown in FIG. 7, when the cover is located over the plug 400 and the second portion 200, the internal surface of the cover 300 is substantially in contact with the exterior surface of the distal end 420 of the plug 400 and the exterior surfaces of the proximal end 210 and the distal end 220 of the second portion 200. However, in further embodiments, the internal surface of the cover 300 may only partially be in contact with the exterior surfaces of the proximal end 210 and the distal end 220 of the second portion 200 and/or the exterior surface of the distal end 420 of the plug 400.

When the first portion 100 is not attached to the second portion 200, the bore 230 of the second portion 200 is exposed, even if the cover 300 is located over the second portion 200, and dirt particles, fluids or other impurities may accumulate in the bore 230 of the second portion 200. However, when the plug 400 is attached to the second portion 200, any dirt particles, fluids or other impurities are prevented from entering the bore 230 of the second portion 200, accumulation of which may otherwise render the second portion 200 unusable or create a blockage in the fluid pathway formed when the first portion 100 is connected to the second portion 200.

Locating the cover 300 over the plug 400 and the second portion 200 provides further protection from dirt particles, fluids or other impurities and prevents them from entering the bore 230 of the second portion 200. Moreover, the cover 300 holds the plug 400 and the second portion 200 in an engaged configuration (where the plug 400 is engaged with the second portion 200), thereby preventing any undesirable movement of the plug 400 and second portion 200 relative to each other which might result in accidental disengagement of the plug 400 with the second portion 200.

In this specification, adjectives such as first and second, left and right, top and bottom, proximal and distal, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A cover system comprising:
   a plug, wherein a proximal end of the plug comprises a protrusion that releasably engages with a second portion of a connector, and wherein, when the plug is engaged with the second portion of the connector, ingress of fluid into the second portion is prevented; and
   a cover comprising an inner surface that is in substantial contact with:
   a first portion and the second portion of the connector when the first portion is releasably engaged with the second portion and the cover is located over the first and second portions of the connector, or
   the plug and the second portion of the connector when the plug is releasably engaged with the second portion of the connector and the cover is located over the plug and the second portion,
   wherein, in an unstretched configuration, the cover comprises:
      a substantially cylindrical first end;
      a substantially cylindrical second end; and
      an intermediate portion located between the first and second ends, and
   wherein a diameter of the intermediate portion is greater than a diameter of the first end and/or the second end,
   wherein the first end has a ridge at a distal end of the first end and the second end has a ridge at a distal end of the second end, wherein the ridges of the first and second ends of the cover only extend radially outwards, and
   wherein, when the cover is in the unstretched configuration, the intermediate portion comprises:
      a first frustoconical portion;
      a second frustoconical portion; and
      a central portion located between the first and second frustoconical portions, and
   wherein the cover is integrally formed.

2. The cover system of claim 1, wherein, when the first portion is engaged with the second portion, a fluid pathway is formed through the first and second portions.

3. The cover system of claim 1, wherein, when the cover is located over at least a portion of the plug and the second portion, ingress of impurities into the second portion is prevented.

4. A connector system comprising:
   a connector comprising:
      a first portion;
      a second portion releasably engageable with the first portion, the first portion having a proximal end that is inserted into a bore of the second portion;
   a cover located over at least a portion of the first and second portions; and
   an integrally formed plug, wherein a proximal end of the plug comprises a protrusion that releasably engages with the second portion,
   wherein, when the first portion is engaged with the second portion, a fluid pathway is formed through the first and second portions,
   wherein, in an unstretched configuration, the cover comprises:
      a substantially cylindrical first end;
      a substantially cylindrical second end; and
      an intermediate portion located between the first and second ends, and
   wherein a diameter of the intermediate portion is greater than a diameter of the first end and/or the second end,
   wherein the first end has a ridge at a distal end of the first end and the second end has a ridge at a distal end of the second end, wherein the ridges of the first and second ends of the cover only extend radially outwards, and
   wherein, when the cover is in the unstretched configuration, the intermediate portion comprises:
      a first frustoconical portion;
      a second frustoconical portion; and
      a central portion located between the first and second frustoconical portions, and
   wherein the cover is integrally formed.

5. The connector system of claim 4, wherein, when the cover is located over the portions of the first and second portions, the cover is substantially in contact with the portions of the first and second portions.

6. The connector system of claim 4, wherein, when the cover is located over the portions of the first and second portions, the cover holds the first and second portions in an engaged configuration where the first portion is engaged with the second portion.

7. The connector system of claim 4, wherein the plug is formed from a polymer.

8. The connector system of claim 4, wherein the cover is locateable over at least a portion of the plug and the second portion.

9. The connector system of claim 4, wherein the cover is permanently attached to the second portion.

10. The connector system of claim 4, wherein the cover is formed from an elastic material.

11. A method of connecting a first portion and a second portion of a connector system, the method including the steps of:
    locating a cover over at least a portion of the second portion and an integrally formed plug releasably engaged with the second portion;
    rolling back a substantially cylindrical first end of the cover over at least a portion of a substantially cylindrical second end of the cover;
    disengaging the plug from the second portion;

engaging the first portion with the second portion by inserting a proximal end of the first portion into a bore of the second portion; and unrolling the first end of the cover, wherein, upon unrolling the first end of the cover, the first end of the cover is located over at least a portion of the first portion, wherein, when the first portion is engaged with the second portion, a fluid pathway is formed through the first and second portions, wherein the cover comprises an intermediate portion located between the first and second ends, wherein, in an unstretched configuration of the cover, a diameter of the intermediate portion is greater than a diameter of the first end and/or the second end, wherein the first end has a ridge at a distal end of the first end and the second end has a ridge at a distal end of the second end, wherein the ridges of the first and second ends of the cover only extend radially outwards, and wherein, when the cover is in the unstretched configuration, the intermediate portion comprises:
- a first frustoconical portion;
- a second frustoconical portion; and
- a central portion located between the first and second frustoconical portions, and wherein the cover is integrally formed.

12. The method of claim 11, wherein locating the cover over the portion of the second portion includes permanently attaching the cover to the second portion.

13. The method of claim 11, wherein the plug is formed from a polymer.

* * * * *